United States Patent
Curtis et al.

(10) Patent No.: US 9,741,273 B1
(45) Date of Patent: Aug. 22, 2017

(54) ILLUMINATED ASSEMBLIES AND METHODS OF MANUFACTURE THEREOF

(71) Applicants: Jeffrey A. Curtis, High Point, NC (US); Brent M. Curtis, Winston-Salem, NC (US)

(72) Inventors: Jeffrey A. Curtis, High Point, NC (US); Brent M. Curtis, Winston-Salem, NC (US)

(*) Notice: Subject to any disclaimer, the term of this patent is extended or adjusted under 35 U.S.C. 154(b) by 0 days.

(21) Appl. No.: 15/426,176

(22) Filed: Feb. 7, 2017

Related U.S. Application Data (60) Provisional application No. 62/372,901, filed on Aug. 10, 2016.

(51) Int. Cl.
| | |
|---|---|
| *F21V 23/00* | (2015.01) |
| *G09F 13/22* | (2006.01) |
| *F21V 23/02* | (2006.01) |
| *F21S 9/02* | (2006.01) |
| *F21V 23/06* | (2006.01) |
| *G02B 5/02* | (2006.01) |
| *F21Y 115/10* | (2016.01) |
| *F21Y 113/13* | (2016.01) |
| *F21Y 105/10* | (2016.01) |

(52) U.S. Cl.
CPC ............... *G09F 13/22* (2013.01); *F21S 9/02* (2013.01); *F21V 23/023* (2013.01); *F21V 23/06* (2013.01); *G02B 5/0268* (2013.01); *G02B 5/0278* (2013.01); *F21Y 2105/10* (2016.08); *F21Y 2113/13* (2016.08); *F21Y 2115/10* (2016.08); *G09F 2013/222* (2013.01)

(58) Field of Classification Search
CPC ........ G09F 13/22; F21V 23/023; F21V 23/06; F21S 9/02; G02B 5/0268; G02B 5/0278
See application file for complete search history.

(56) References Cited

U.S. PATENT DOCUMENTS

| | | |
|---|---|---|
| 5,143,433 A | 9/1992 | Farrell |
| 5,491,376 A | 2/1996 | Levine |
| 5,944,405 A | 8/1999 | Takeuchi |
| 5,954,423 A | 9/1999 | Logan |
| 6,074,074 A | 6/2000 | Marcus |
| 6,308,444 B1 | 10/2001 | Ki |
| 6,330,111 B1 | 12/2001 | Myers |
| 6,354,714 B1 | 3/2002 | Rhodes |
| 6,640,476 B1 | 11/2003 | Miller |

(Continued)

*Primary Examiner* — Thomas M Sember
(74) *Attorney, Agent, or Firm* — NK Patent Law, PLLC (57) ABSTRACT

An illuminated assembly includes a substrate that is rigid so as to maintain a shape, the substrate having a first terminal surface and a second terminal surface. The assembly includes at least one channel defined into the substrate, the at least one channel having: an exposed portion defined on the first terminal surface of the substrate to define an indicia for display, a base portion defined between the first and second terminal surfaces of the substrate, and two channel walls extending from the exposed portion to the base portion. The assembly includes at least one light source between the exposed portion and the base portion of the at least one channel. The assembly includes a compound defined in an intermediate portion of the at least one channel, the intermediate portion extending from the at least one light source to the two channel walls, the exposed portion, and the base portion.

29 Claims, 13 Drawing Sheets

(56) References Cited

U.S. PATENT DOCUMENTS

| | | | |
|---|---|---|---|
| 6,682,205 B2 | 1/2004 | Lin | |
| 6,796,700 B2 | 9/2004 | Kraft | |
| 6,840,655 B2 | 1/2005 | Shen | |
| 7,086,769 B1* | 8/2006 | Thompson | G02B 6/0001 361/236 |
| 7,104,671 B2 | 9/2006 | Tseng | |
| 7,754,504 B2 | 7/2010 | Ohmae | |
| 7,794,099 B2 | 9/2010 | Wang | |
| 8,444,287 B2 | 5/2013 | Hardesty | |
| 8,540,403 B2 | 9/2013 | Komuro | |
| 8,794,811 B2 | 8/2014 | Germain | |
| 8,896,786 B2 | 11/2014 | Seo | |
| 8,899,811 B2 | 12/2014 | Jung | |
| 9,110,209 B2 | 8/2015 | Blessitt et al. | |
| 9,223,073 B2 | 12/2015 | Doo et al. | |
| 9,318,035 B2 | 4/2016 | Lee et al. | |
| 2003/0147259 A1 | 8/2003 | Kraft | |
| 2004/0085017 A1 | 5/2004 | Lee | |
| 2004/0105264 A1 | 6/2004 | Spero | |
| 2008/0060236 A1* | 3/2008 | Chiang | G09F 13/04 40/563 |
| 2008/0060238 A1* | 3/2008 | Chiang | G09F 13/04 40/564 |
| 2008/0101082 A1 | 5/2008 | Kitamura | |
| 2010/0135020 A1 | 6/2010 | Moore | |
| 2012/0000104 A1 | 1/2012 | Peeters | |
| 2012/0055055 A1* | 3/2012 | Kunowski | G09F 13/04 40/544 |
| 2012/0320627 A1 | 12/2012 | Araki | |
| 2013/0135853 A1 | 5/2013 | Lin | |
| 2013/0279160 A1 | 10/2013 | Myers et al. | |
| 2014/0043797 A1 | 2/2014 | Sun | |
| 2014/0104867 A1 | 4/2014 | Meng | |
| 2014/0104876 A1 | 4/2014 | Yang et al. | |
| 2014/0185293 A1 | 7/2014 | Ayotte | |
| 2014/0259819 A1 | 9/2014 | Dalpra | |

* cited by examiner

ILLUMINATED ASSEMBLIES AND METHODS OF MANUFACTURE THEREOF

CROSS-REFERENCE TO RELATED APPLICATION

This application claims the benefit of priority of U.S. provisional patent application No. 62/372,901 titled "Method of Forming an Illuminated Design On a Substrate" filed on Aug. 10, 2016, which is incorporated herein in its entirety by this reference.

TECHNICAL FIELD

The present invention relates to illuminated assemblies and methods of manufacture thereof. Particular embodiments of the present invention are directed to illuminated assemblies utilizing low-voltage light sources to produce bright, uniform illumination.

BACKGROUND

Electric "neon" signs—electrified glass tubes containing noble gasses—have been used in the signage industry since the early twentieth century. "Neon" signs can be manufactured in custom shapes or forms and produce a bright, even illumination that can be seen from great distances. These properties are advantageous for both decorative and advertising purposes in the signage industry. There are, however, several drawbacks to "neon" signs. "Neon" signs must be powered by dedicated "neon" sign transformers which convert standard line voltages, which convert normal 120 volt lines up to the 2,000 to 15,000 volts necessary to power "neon" signs. "Neon" sign transformers consume a lot of power, driving up operating costs, and malfunction at regular intervals, requiring costly maintenance and repairs. Malfunctioning "neon" signs or "neon" sign transformers can further present dangerous fire hazards and risk of shock to humans from voltages as high as 60,000 volts at 12.5 amps. "Neon" signs also have several commercial drawbacks. They are difficult (i.e., expensive) to manufacture as the glass tubes must be heated and bent by hand into a desired shape. "Neon" signs, being made of glass, are also very fragile, increasing the costs of shipping manufactured signs to distant locations. Additionally, because the color of "neon" signs are determined by the gas composition within the glass tubes, "neon" signs are available in only a limited number of colors and cannot be easily be changed.

In the signage industry, signs using light-emitting diodes (LEDs) have gained in popularity as an alternative to "neon" signs due to their low manufacturing and operating costs. LED based signs are cheaper to manufacture and consume significantly less energy than "neon" signs. LED based signs can be powered by standard low voltage electrical outlets and may last for decades. They may be made with materials such as wood, polymers, or metal, rather than glass, making them much more durable and easier to ship than "neon" signs. Prior art LED signs have two distinct problems: they cannot be made to maintain rigid shapes or designs, or they produce signs with hotspots rather than producing an even illumination.

Although there are LED signs in the marketplace, none of them are an adequate substitution for the bright, even illumination provided by a "neon" sign. There remains a need for illuminated assemblies that produce a bright, even illumination equivalent to the "neon" look, with the benefits of low voltage power consumption.

SUMMARY OF THE INVENTION

This summary is provided to introduce in a simplified form concepts that are further described in the following detailed descriptions. This summary is not intended to identify key features or essential features of the claimed subject matter, nor is it to be construed as limiting the scope of the claimed subject matter. Although discussed in the context of the signage industry, the present invention is not limited in application to signs.

According to at least one embodiment, an illuminated assembly is provided. The assembly may include a substrate that is rigid so as to maintain a shape, the substrate having a first terminal surface and a second terminal surface. The assembly may further include at least one channel defined into the substrate, the at least one channel having: an exposed portion defined on the first terminal surface of the substrate to define an indicia for display, a base portion defined between the first and second terminal surfaces of the substrate, and two channel walls extending from the exposed portion to the base portion. The assembly may further include at least one light source between the exposed portion and the base portion of the at least one channel. The assembly may further include a diffusion compound defined in an intermediate portion of the at least one channel, the intermediate portion extending from the two channel walls, the exposed portion, and the base portion to the at least one light source.

According to at least one embodiment, an illuminated assembly is provided. The assembly may include a substrate that is rigid so as to maintain a shape to define an indicia for display, the substrate having a first terminal surface and a second terminal surface. The assembly may further include at least one channel defined into the substrate, the at least one channel having: an exposed portion defined on the first terminal surface of the, a base portion defined between the first and second terminal surfaces of the substrate, and two channel walls extending from the exposed portion to the base portion. The assembly may further include at least one light source between the exposed portion and the base portion of the at least one channel. The assembly may further include a diffusion compound defined in an intermediate portion of the at least one channel, the intermediate portion extending from the two channel walls, the exposed portion, and the base portion to the at least one light source.

According to at least another embodiment, the compound diffuses light emanating from the at least one light source.

According to at least another embodiment, the compound is optically clear.

According to at least another embodiment, the substrate diffuses light emanating from the at least one light source.

According to at least another embodiment, the substrate reflects light emanating from the at least one light source.

According to at least another embodiment, the at least one light source may include a plurality of light sources spaced equidistantly apart.

According to at least another embodiment, the at least one light source may include a plurality of light sources electrically coupled to one another.

According to at least another embodiment, the assembly may further include a power source coupled to the plurality of light sources.

According to at least another embodiment, the power source is a rechargeable battery housed within the substrate.

According to at least another embodiment, the at least one light source is a light emitting diode.

According to at least another embodiment, the at least one light source can be programmed to emit a plurality of colors.

According to at least one embodiment, a method of manufacturing an illuminated assembly is provided. The method may include forming at least one channel into a substrate that is rigid so as to maintain a shape, wherein the at least one channel comprises: an exposed portion defined on a first terminal surface of the substrate, a base portion defined between the first terminal surface and a second terminal surface of the substrate, and two channel walls extending from the exposed portion to the base portion. The method may further include placing at least one light source between the exposed portion and base portion of the at least one channel. The method may further include pouring a liquid diffusion compound into an intermediate portion of the at least one channel, the intermediate portion extending from the two channel walls, the exposed portion, and the base portion to the at least one light source.

According to at least another embodiment, the compound diffuses light emanating from the at least one light source.

According to at least another embodiment, the compound is optically clear.

According to at least another embodiment, the substrate diffuses light emanating from the at least one light source.

According to at least another embodiment, the substrate reflects light emanating from the at least one light source.

According to at least another embodiment, the at least one light source includes a plurality of light sources.

According to at least another embodiment, the method may further include electrically coupling the plurality of light sources to one another.

According to at least another embodiment, the method may further include coupling the plurality of light sources to a rechargeable power source housed within the substrate.

According to at least another embodiment, the plurality of light sources are spaced equidistantly apart.

According to at least another embodiment, the at least one light sources is a light emitting diode.

According to at least another embodiment, the at least one light source can be programmed to emit a plurality of colors.

According to at least another embodiment, the method further include curing the liquid compound into a solid state.

DETAILED DESCRIPTIONS

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although the term "step" may be expressly used or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims. For example, although discussed in the context of the signage industry, the illuminated assemblies contemplated by the present invention are not limited to signage applications.

Figure 1:
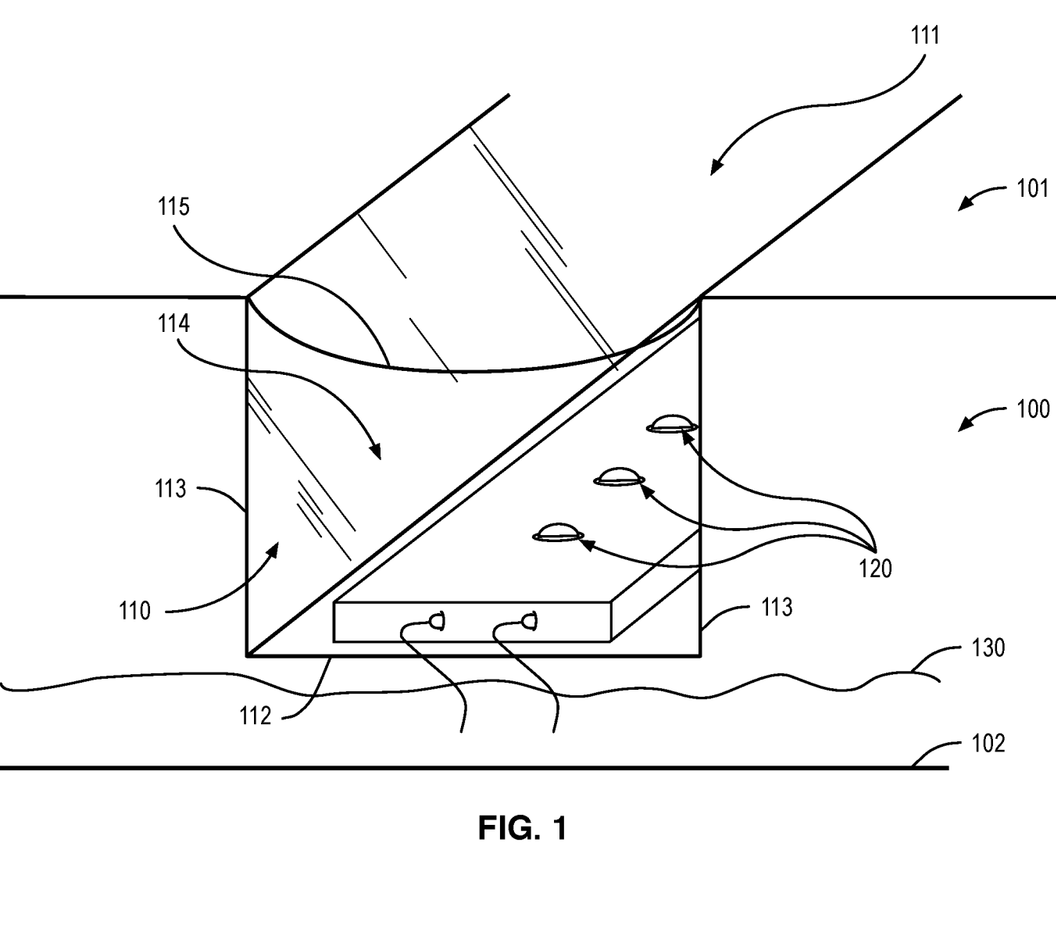
FIG. 1 is a close-up, cut-away of a channel according to at least one embodiment of the present invention.

Referring now to FIG. 1, a close-up of a channel 110 according to at least one embodiment of the present invention is shown. The channel 110 may be defined into the substrate 100, the channel 110 having an exposed portion 111 defined on the first terminal surface 101 of the substrate 100 to define an indicia for display. The channel 110 may also have a base portion 112 defined between the first and second terminal surfaces 101, 102 of the substrate 100 and two channel walls 113 extending from the exposed portion 111 to the base portion 112. A commercially available LED strip 120 or other suitable compact, low-voltage light source may be placed in the channel 110. A compound 115 is defined in an intermediate portion 114 of the channel 110, the intermediate portion 114 extending from the two channel walls 113, the exposed portion 111, and the base portion 112 to the at least one light source 120. The compound need not occupy the entirety of the intermediate portion 114.

Figure 2A:
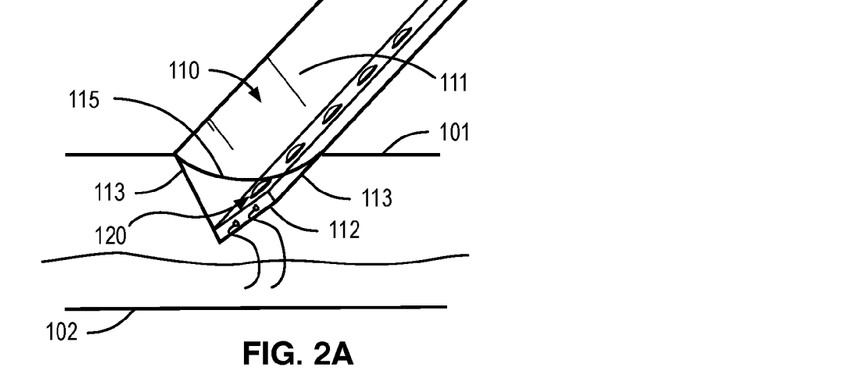
FIG. 2A is a close-up cut-away of a channel according to at least one embodiment of the present invention.
Figure 2B:
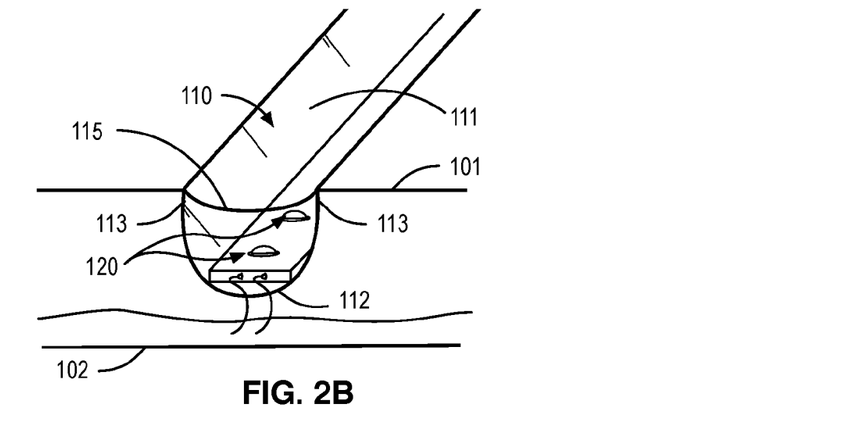
FIG. 2B is a close-up cut-away of a channel according to at least one embodiment of the present invention.
Figure 2C:
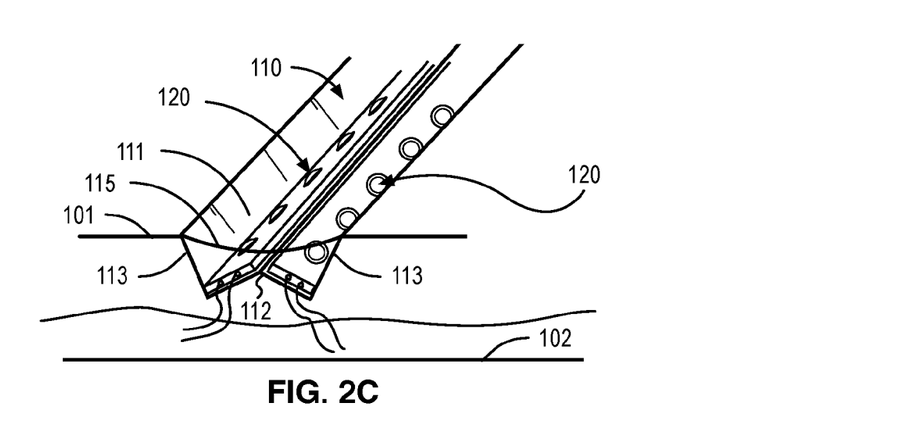
FIG. 2C is a close-up cut-away of a channel according to at least one embodiment of the present invention.

Referring now to FIGS. 2A-2C, the base portion 112 need not be a planar region. In some embodiments, the base portion 112 is a line parallel to the exposed portion 111, the two channel walls 113 meeting at the same point on the base portion 112 as illustrated in FIGS. 2A and 2B. The LED strip 120 or other suitable compact, low-voltage light source may be oriented horizontally or vertically within the channel 110. The base portion 112 may also comprise a more complicated convex shape as illustrated in FIG. 2C.

The at least one light source 120 may comprise any compact, low-voltage light source. In some embodiments, the at least one light source 120 may comprise a light emitting diode (LED). LEDs have the benefits of being compact, low-voltage, long-lasting, and programmable to display a plurality of colors. In at least one-embodiment of the invention, the at least one light source 120 may be programmed to emit a plurality of colors. For example, the at least one light source 120 can be programmed to emit a single color that changes over time, or in embodiments where there is more than one light source 120, each light source may be programmed to emit a different color.

In at least one embodiment, the at least one light source 120 includes a plurality of light sources spaced equidistantly apart. LED ribbons or strips available on the market may be used in the channel 110 to readily achieve equidistantly spaced light sources, but the present invention may be practiced with any compact, low-voltage light source. The at least one light source 120 may also include a plurality of light sources electrically coupled to one another by coupling the plurality of light sources to a common wire 130 or other conductive material. In at least one embodiment, the assembly may further comprise a power source coupled to the plurality of light sources. The common wire or other conductive material may be connected to an alternating current plug that plugs into a standard 120V outlet.

Figure 3:
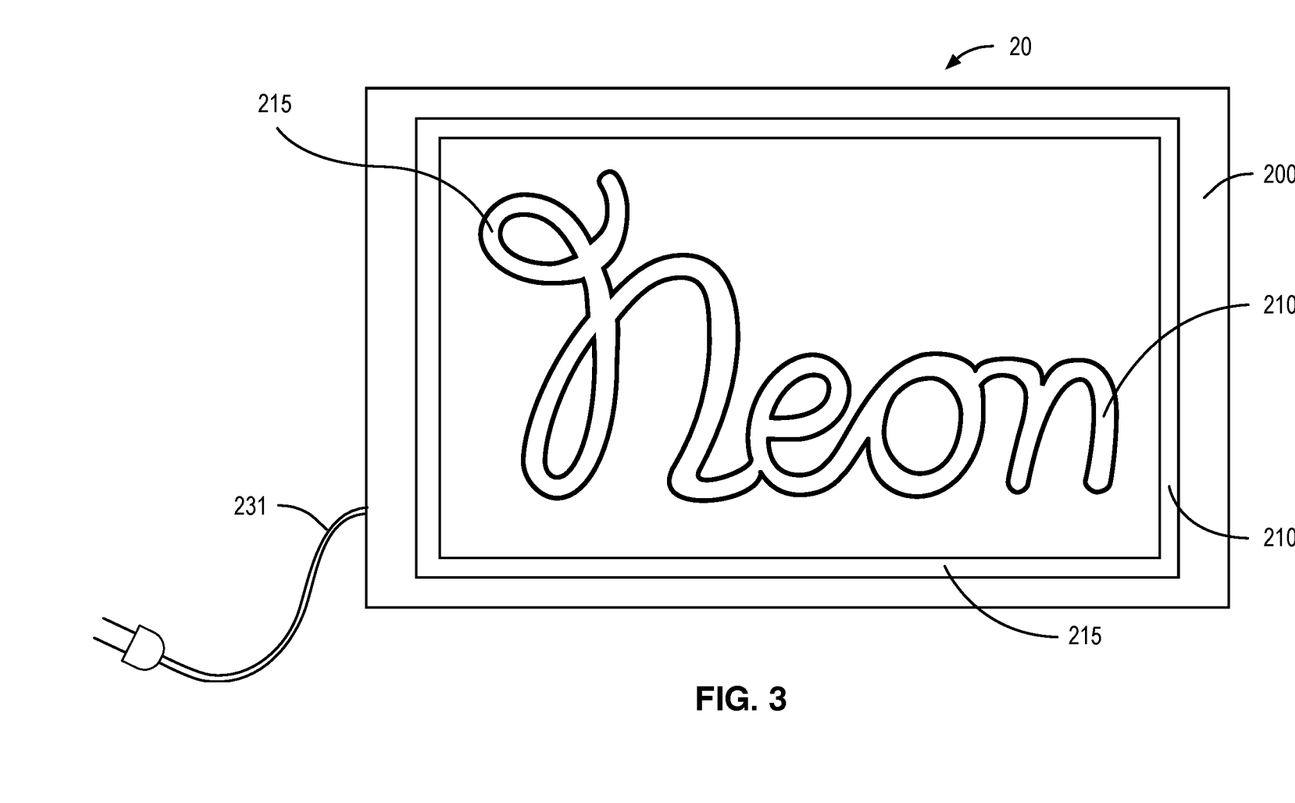
FIG. 3 is a bird's eye view of an illuminated assembly according to at least one embodiment of the present invention.
Figure 4:
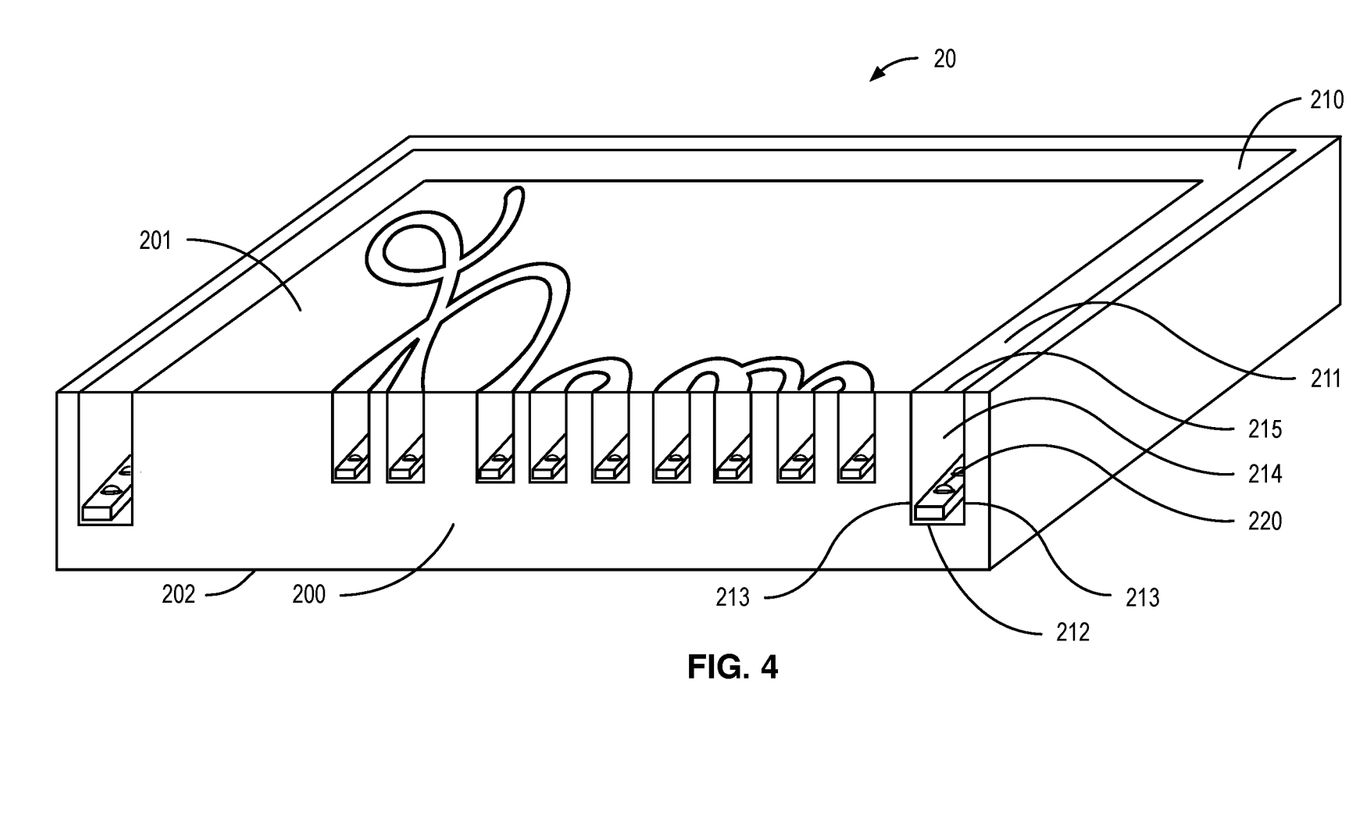
FIG. 4 is a cut-away, isometric view of an illuminated assembly according to at least one embodiment of the present invention.

Referring now to FIGS. 3 and 4, an illuminated assembly 20 according to at least one embodiment of the present invention is shown. The illuminated assembly 20 may comprise a substrate 200 that is rigid so as to maintain a shape, the substrate 200 having a first terminal surface 201 and a second terminal surface 202. At least one channel 210 may be defined into the substrate 200, the at least one channel 210 having an exposed portion 211 defined on the first terminal surface 201 of the substrate 200 to define an indicia for display, a base portion 212 between the first and second terminal surfaces 201, 202 of the substrate 200, and two channel walls 213 extending from the exposed portion 211 to the base portion 212. The illuminated assembly 20 may further comprise at least one light source 220 between the exposed portion 211 and the base portion 212 of the at least one channel 210. The illuminated assembly 20 may yet further comprise a compound 215 defined in an intermediate portion 214 of the at least one channel 210, the intermediate portion 214 extending from the two channel walls 213, the exposed portion 211, and the base portion 212 to the at least one light source 220.

The substrate 200 may be a substantially planar slab and may comprise any material that is sufficiently rigid to maintain shape. Exemplary materials include, but are not limited to, wood, acetal, acrylic, acrylonitrile butadiene styrene (ABS), high-density polyethylene (HDPE), polycarbonate, polystyrene, polyurethane, polyvinyl chloride (PVC), ultra-high molecular weight polyethylene (UHMW), aluminum, metal alloys, and composites, etc. In some embodiments, the substrate 200 may reflect light emanating from the at least one light source 220. The substrate 200 may comprise materials with a high coefficient of reflection—for example, PVC—to achieve said reflection. In such embodiments, some of the light from the at least one light source travels towards the exposed portion 211, but some of the light from the at least one light source 220 is reflected off the substrate 200 and directed back toward the exposed portion 211 of the channel 210, diffusing the light from the at least one light source across an area of the exposed portion 211, and increasing the luminance of the illuminated assembly 20.

The compound 215 occupies at least part of an intermediate portion 214 of the channel 210 between the light source 220 and the exposed portion 211. The compound 215 need not fill (or "overfill") the entire volume of the intermediate portion 214. In other words, the compound 215 may not be flush with the first terminal surface 201 of the substrate 200. The compound 215 may be any liquid material that eventually hardens to a soft or rigid solid. In some embodiments, the compound 215 is an optically clear material. Exemplary materials include, but are not limited to, polycarbonate, acrylic, amorphous polymers, etc. In some embodiments, the light is diffused by reflecting off the substrate 200, and passes through the optically clear compound 215 unperturbed.

In preferred embodiments, the compound 215 diffuses light emanating from the at least one light source 220. Exemplary materials capable of diffusing light include, but are not limited to, silicone, urethane, polyurethane, acrylics, epoxy resins, etc. The compound 215 scatters the light from the at least one light source 220, eliminating bright spots around the light source 220 and producing an even illumination across the exposed portion 211. The exposed portion 211 of the channel 210 may define the indicia for display in any predetermined shape, design, or pattern.

Figure 5:
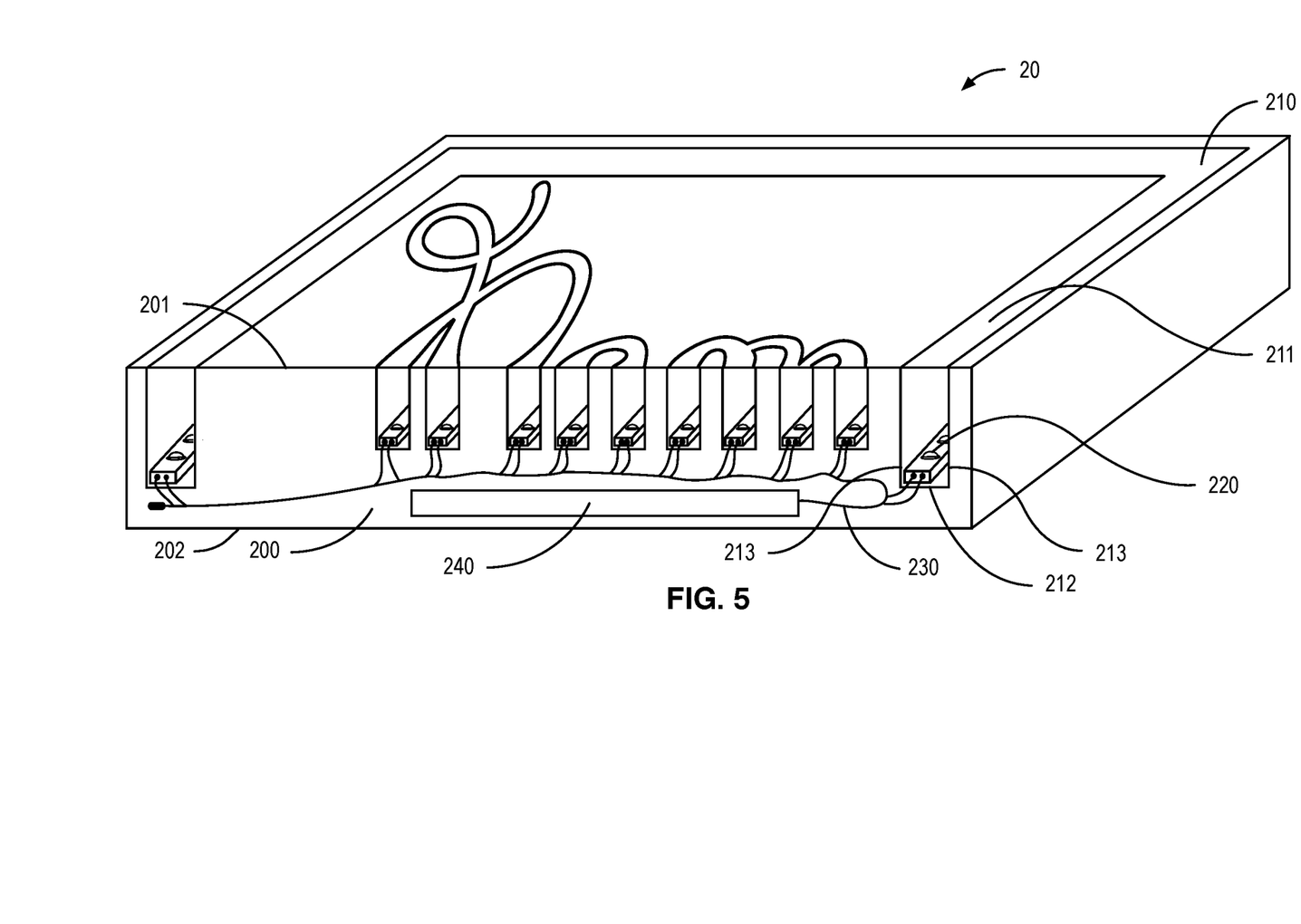
FIG. 5 is a cut-away, isometric view of an illuminated assembly according to at least one embodiment of the present invention.

Referring now to FIGS. 4 and 5, an illuminated assembly 20 according to at least one embodiment of the present invention is shown. The power source may be a rechargeable battery 240 housed within the substrate 200. The common wire 230 or other conductive material connects directly to the rechargeable battery 240, and the rechargeable battery 240 may be connected to an alternating current plug 231 that may recharge the rechargeable battery 240 from a standard 120V outlet.

Figure 6:
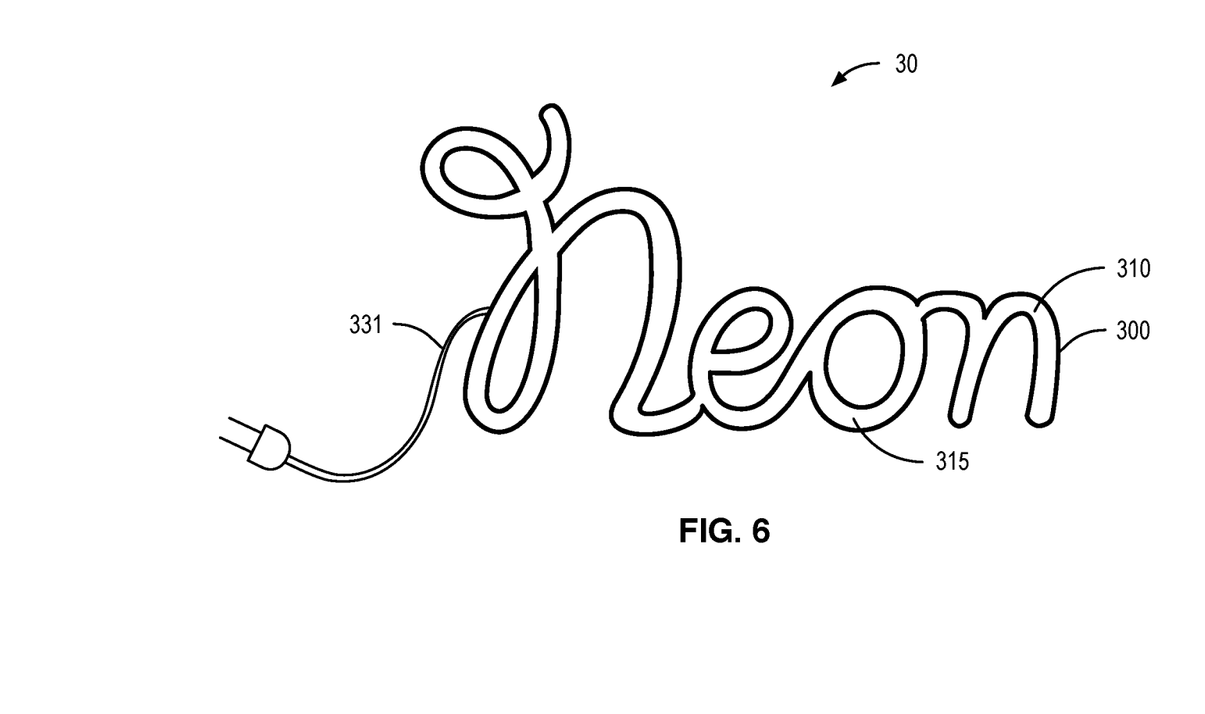
FIG. 6 is a bird's eye view of an illuminated assembly according to at least one embodiment of the present invention.
Figure 7:
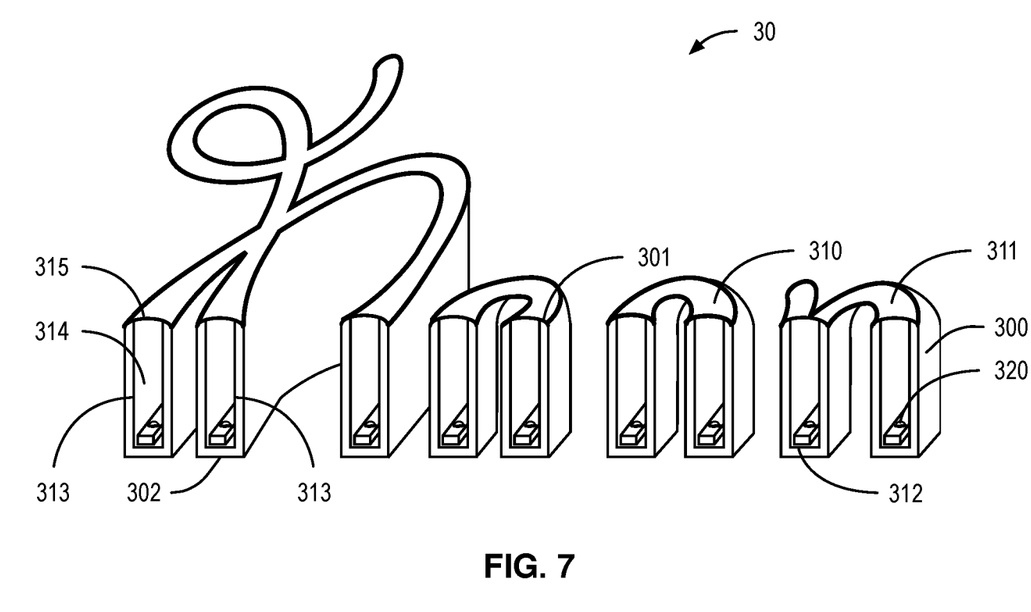
FIG. 7 is a cut-away, isometric view of an illuminated assembly according to at least one embodiment of the present invention.

Referring now to FIGS. 6 and 7, an illuminated assembly 30 according to at least one embodiment of the present invention is shown. The illuminated assembly 30 may comprise a substrate 300 that is rigid so as to maintain a shape to define an indicia for display, the substrate 300 having a first terminal surface 301 and a second terminal surface 302. At least one channel 310 may be defined into the substrate 300, the at least one channel 310 having an exposed portion 311 defined on the first terminal surface 301 of the substrate, a base portion 312 between the first and second terminal surfaces 301, 302 of the substrate 300, and two channel walls 313 extending from the exposed portion 311 to the base portion 312. The illuminated assembly 30 may further comprise at least one light source 320 between the exposed portion 311 and the base portion 312 of the at least one channel 310. The illuminated assembly 30 may yet further comprise a compound 315 defined in an intermediate portion 314 of the at least one channel 310, the intermediate portion 314 extending from the two channel walls 313, the exposed portion 311, and the base portion 312 to the at least one light source 320.

In some embodiments, the substrate 300 may comprise a material sufficiently rigid to maintain a predetermined shape, design, or pattern which defines an indicia for display. The substrate 300 may diffuse light emanating from the at least one light source 320. In preferred embodiments, the substrate 300 comprises light diffusing materials such as urethane, polyurethane, acrylics, epoxy resins, etc. Instead of reflecting or absorbing light from the at least one light source 320, the substrate may 300 diffuses the light, emitting a bright, even illumination from the entire predetermined shape, design, or pattern rather than from just the exposed portion 311.

The compound 315 occupies at least part of an intermediate portion 314 of the channel between the light source 320 and the exposed portion 311. The compound 315 need not fill (or "overfill") the entire volume of the intermediate portion 314. In some embodiments, the compound 315 sits flush with the first terminal surface 301 of the substrate 300 to mimic the look of a glass "neon" tube. The compound 315 may be any liquid material that eventually hardens to a soft or rigid solid and may be the same material as the substrate 300. In preferred embodiments, the compound 315 diffuses light emanating from the at least one light source 320. The compound 315 scatters the light from the at least one light source 320, eliminating bright spots around the light source 320 and producing an even and continuous illumination from both the substrate 300 and the exposed portion 311.

Referring now to FIGS. 8A through 8E, a method of manufacturing an illuminated assembly 40 is shown. The method may comprise forming at least one channel 410 into a substrate 400 that is rigid so as to maintain a shape, wherein the at least one channel 410 comprises an exposed portion 411 defined on a first terminal surface 401 of the substrate 400 to define an indicia for display, a base portion 412 defined between the first terminal surface 401 and a second terminal surface 402 of the substrate 400, and two channel walls 413 extending from the exposed portion 411 to the base portion 412. The method may further comprise placing at least one light source 420 between the exposed portion 411 and base portion 412 of the at least one channel 410. The method may further comprise pouring a liquid compound 415 into an intermediate portion 414 of the at least one channel 410, the intermediate portion 414 extending from the two channel walls 413, the exposed portion 411, and the base portion 412 to the at least one light source 420.

Figure 8A:
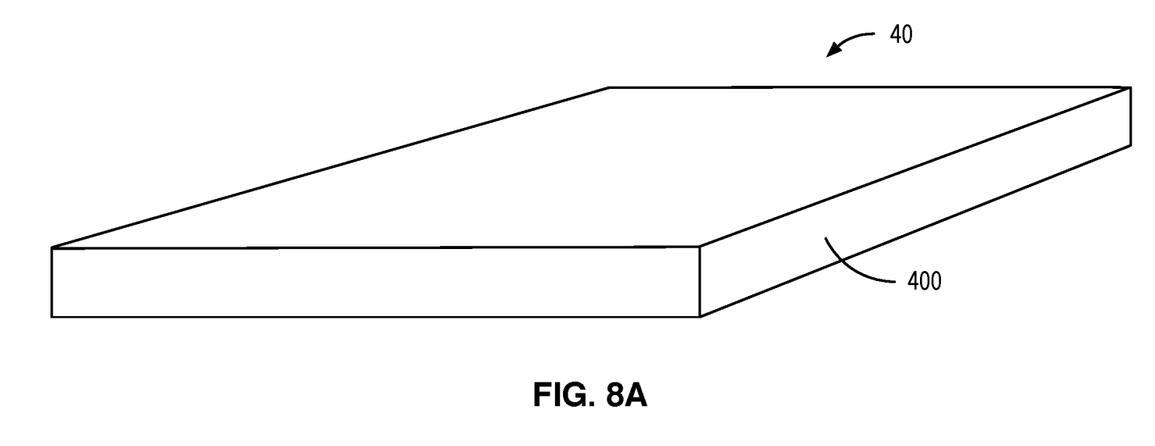
FIG. 8A is a cut-away, isometric view of a substrate according to at least one embodiment of the present invention.
Figure 8B:
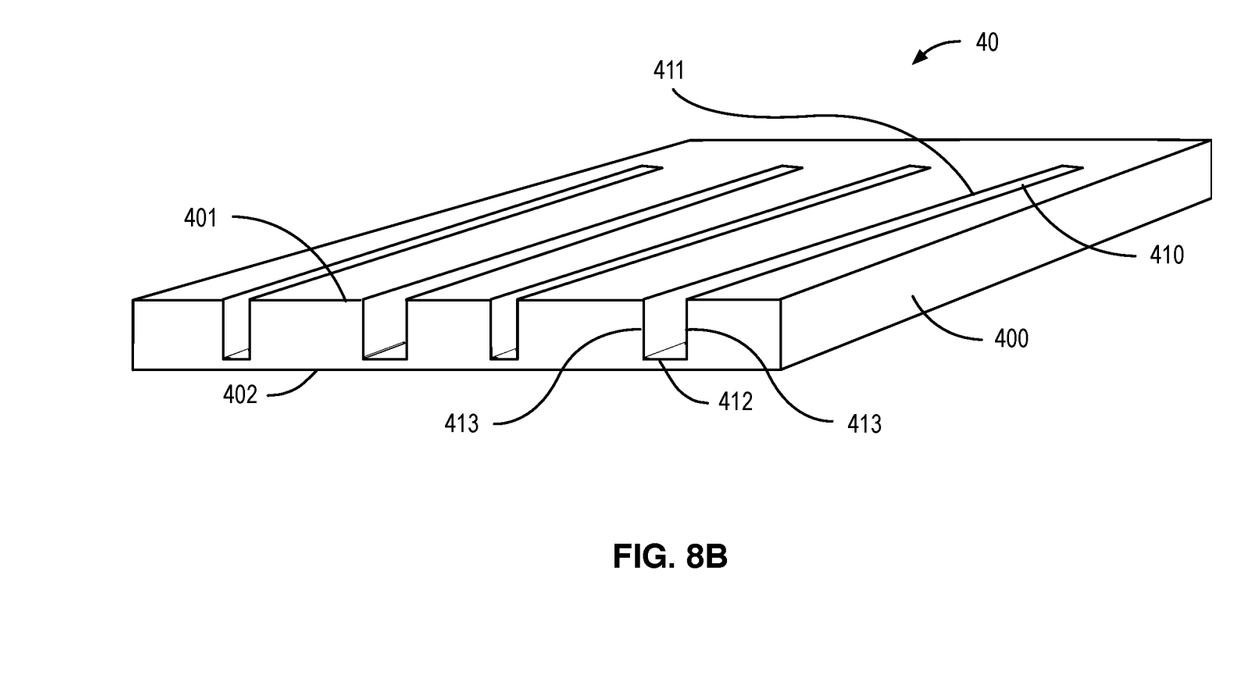
FIG. 8B is a cut-away, isometric view of channels formed into a substrate according to at least one embodiment of the present invention.

Substrate 400 may be a square, rectangle, a custom shape, or any shape as long as the present invention functions as disclosed herein. The shape or design of the substrate 400 as well as the shape or design of the at least one channel 410 may be formed by a variety of methods known in the art including, but not limited to: engraving or incising the at least one channel 410 into the substrate 400 using a CNC machine, routing machine, or hand-held carving tools; or thermoforming, vacuum-forming, press-forming, or 3D printing the substrate 400 with the at least one channel 410.

The at least one channel 410 may form a predetermined or desired design, such as logos, marketing or advertising designs, purely aesthetic designs, or other indicia for display. Advantageously the depth, width, and volume of the at least one channel 410 may vary and are not required to be consistent, allowing for illuminated assemblies with lights at varying depths.

Figure 8C:
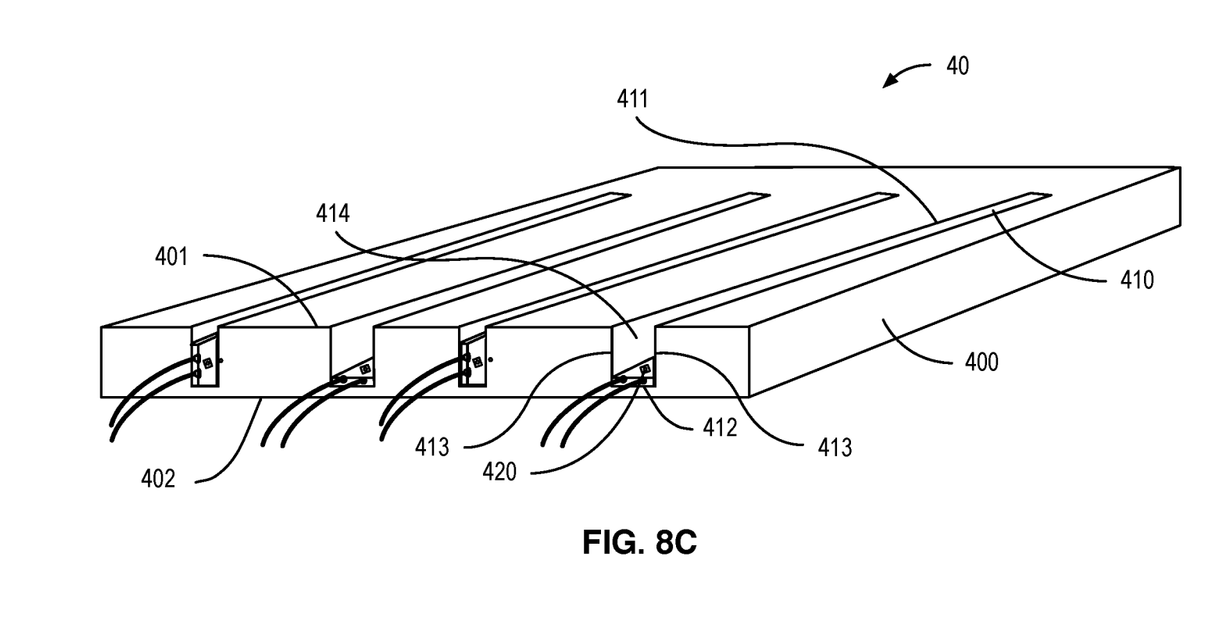
FIG. 8C is a cut-away, isometric view of light sources placed into channels according to at least one embodiment of the present invention.

The at least one light source 420 may be placed within the at least one channel 410. The at least one light source 420 may comprise LED lighting, such as LED ribbons or strips that can extend along the at least one channel 410 for a desired length. The at least one light source 420 may be oriented differently relative to an adjacent light source 420, as illustrated in FIG. 8C, wherein LED ribbons are placed both horizontally and vertically. The light source 420 may be programmed with different colors as well as timing patterns, it being understood that the at least one light source 420 may have electrical wiring or connectors that extend beyond its associated channel 410.

Figure 8D:
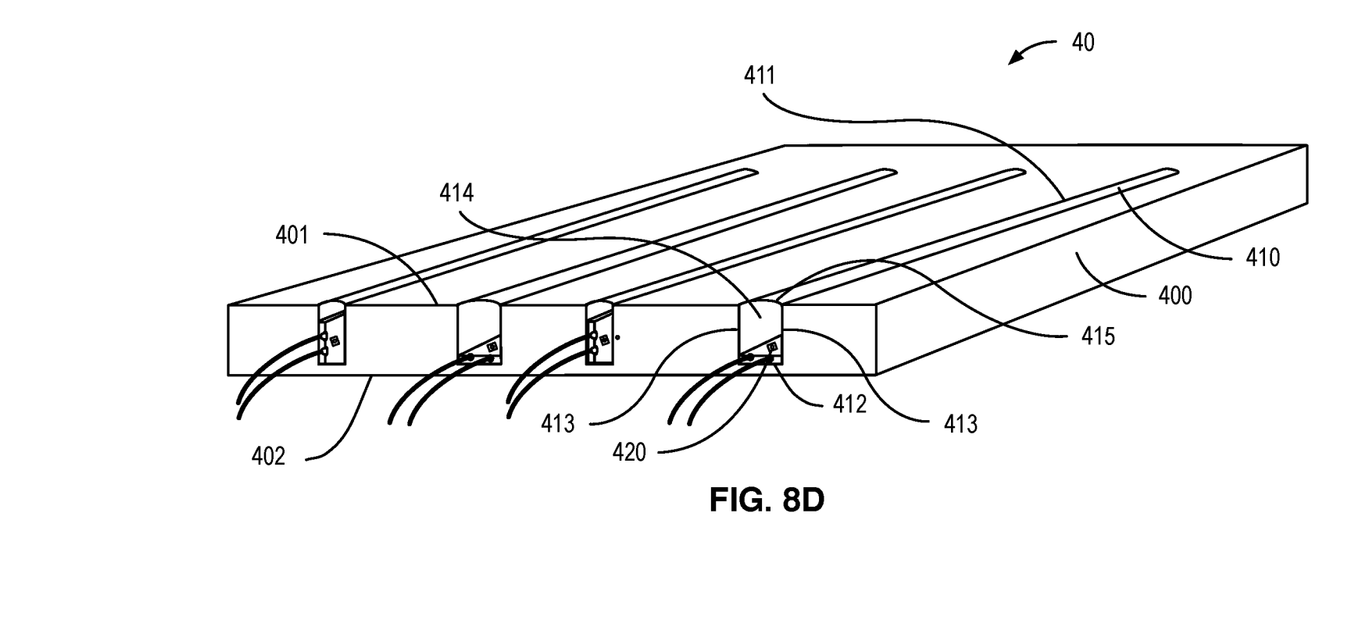
FIG. 8D is a cut-away, isometric view of a liquid diffusion compound poured into an intermediate portion of the channel according to at least one embodiment of the present invention.
Figure 8E:
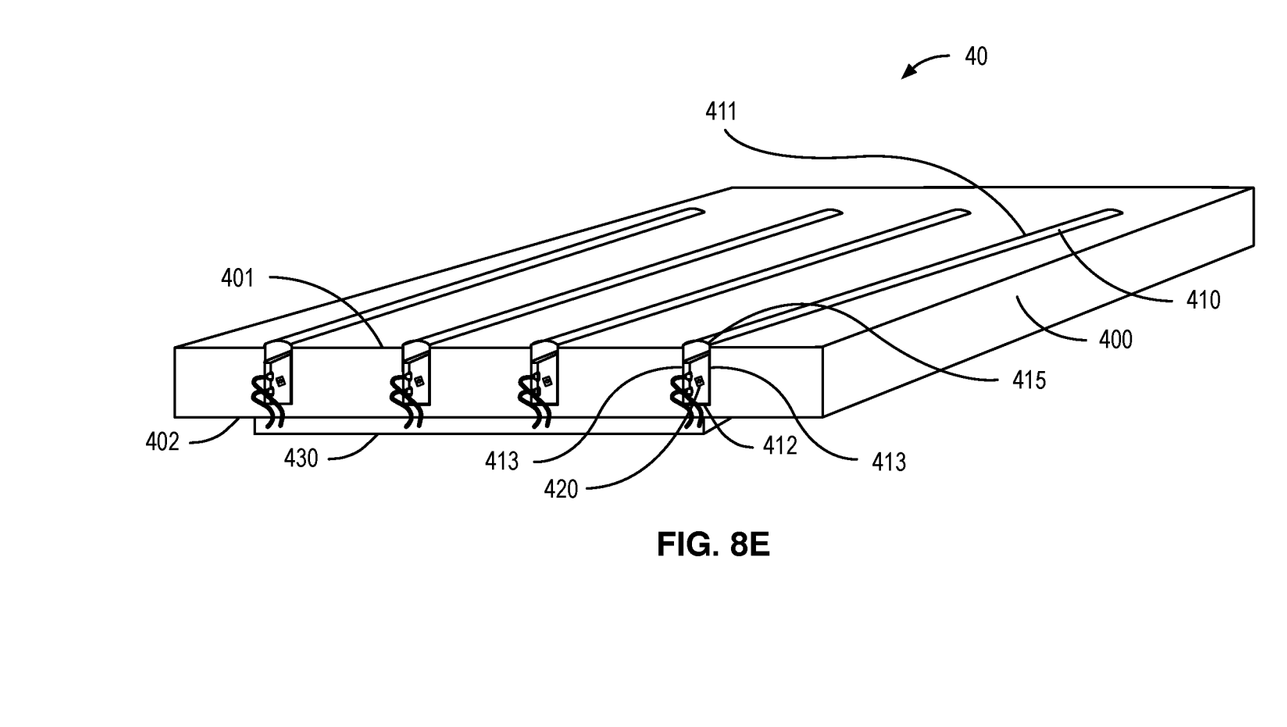
FIG. 8E is a cut-away, isometric view of an illuminated assembly according to at least one embodiment of the present invention.

A liquid compound 415 may be poured into an intermediate portion 414 of the at least one channel 410. The compound 415 may or may not diffuse light emanating from the at least one light source 420 and may or may not sit flush with the first terminal surface 401 of the substrate 400 as previously disclosed herein. The compound 415 may harden to a soft or rigid solid. In some embodiments, the method may further comprise curing the liquid compound 415 into a solid state.

In at least one embodiment, the at least one light source 420 may be a plurality of light sources. The method may further comprise electrically coupling the plurality of light sources to one another. This may be achieved by wiring the plurality of light sources to a common wire 430 or other conductive material. In at least one embodiment, the method may yet still further comprise coupling the plurality of light sources to a rechargeable power source housed within the substrate 400, for example, a rechargeable lithium ion battery.

Figure 9:
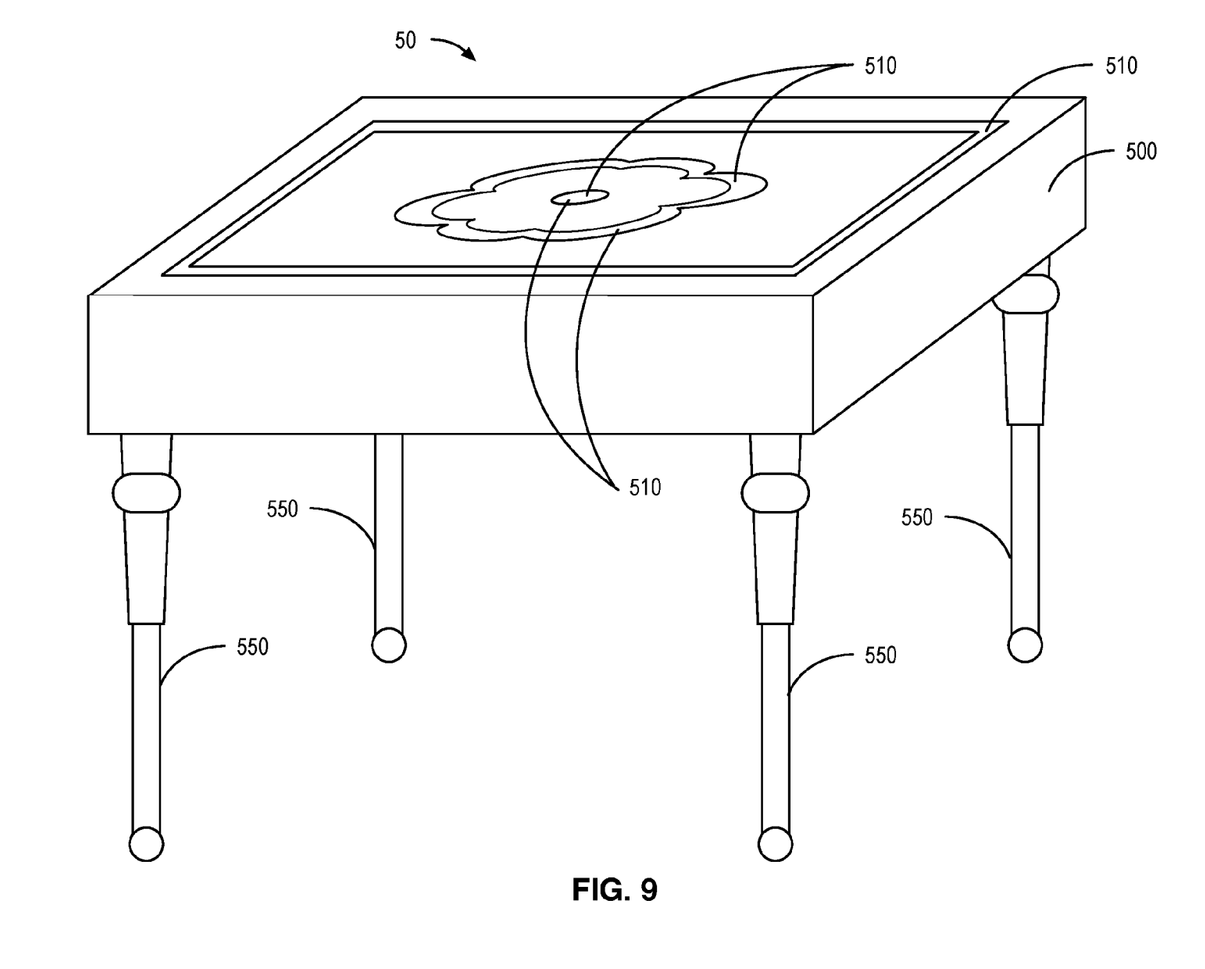
FIG. 9 is an isometric view of an illuminated assembly according to at least one embodiment of the present invention.

Referring now to FIG. 9, an illuminated assembly 50 according to at least one embodiment of the present invention is shown. The present invention is not limited to signage or advertising applications. The present invention may be used to incorporate bright, even illuminated designs into any suitable substrate. For example, the illuminated assembly 50 may comprise a substrate 500, wherein the substrate 500 is a tabletop. At least one channel 510 is defined into the substrate 500 and filled with at least one light source 520 and compound 515 as previously disclosed herein. The illuminated assembly 50 produces a bright, even illumination mimicking a "neon" light from the exposed portion of the channel 510. The illuminated assembly 50 may further comprise table legs 550.

Those skilled in the art will recognize improvements and modifications to the embodiments of the present disclosure. All such improvements and modifications are considered within the scope of the concepts disclosed herein and the claims that follow.

What is claimed is:
1. An illuminated assembly comprising:
 a substrate that is rigid so as to maintain a shape, the substrate having a first terminal surface and a second terminal surface;
 at least one channel defined into the substrate, the at least one channel having an exposed portion defined on the first terminal surface of the substrate to define an indicia for display,
  a base portion defined between the first and second terminal surfaces of the substrate, two channel walls extending from the exposed portion to the base portion;

at least one light source between the exposed portion and the base portion of the at least one channel; and
a compound defined in an intermediate portion of the at least one channel, the intermediate portion extending from the two channel walls, the exposed portion, and the base portion to the at least one light source.

2. The assembly of claim 1, wherein the compound diffuses light emanating from the at least one light source.

3. The assembly of claim 2, wherein the substrate reflects light emanating from the at least one light source.

4. The assembly of claim 2, wherein the substrate diffuses light emanating from the at least one light source.

5. The assembly of claim 1, wherein the at least one light source includes a plurality of light sources spaced equidistantly apart.

6. The assembly of claim 1, wherein the at least one light source includes a plurality of light sources electrically coupled to one another.

7. The assembly of claim 6, further comprising:
a power source coupled to the plurality of light sources.

8. The assembly of claim 7, wherein the power source is a rechargeable battery housed within the substrate.

9. The assembly of claim 1, wherein the at least one light source is a light emitting diode.

10. The assembly of claim 9, wherein the at least one light source can be programmed to emit a plurality of colors.

11. An illuminated assembly comprising:
a substrate that is rigid so as to maintain a shape to define an indicia for display, the substrate having a first terminal surface and a second terminal surface;
at least one channel defined into the substrate, the at least one channel having an exposed portion defined on the first terminal surface of the substrate,
a base portion defined between the first and second terminal surfaces of the substrate, two channel walls extending from the exposed portion to the base portion;
at least one light source between the exposed portion and the base portion of the at least one channel; and
a compound defined in an intermediate portion of the at least one channel, the intermediate portion extending from the two channel walls, the exposed portion, and the base portion to the at least one light source.

12. The assembly of claim 11, wherein the compound diffuses light emanating from the at least one light source.

13. The assembly of claim 12, wherein the substrate reflects light emanating from the at least one light source.

14. The assembly of claim 12, wherein the substrate diffuses light emanating from the at least one light source.

15. The assembly of claim 11, wherein the at least one light source includes a plurality of light sources spaced equidistantly apart.

16. The assembly of claim 15, wherein the at least one light source includes a plurality of light sources electrically coupled to one another.

17. The assembly of claim 11, wherein the at least one light source is a light emitting diode.

18. The assembly of claim 17, wherein the at least one light source can be programmed to emit a plurality of colors.

19. A method of manufacturing an illuminated assembly comprising:
forming at least one channel into a substrate that is rigid so as to maintain a shape, wherein the at least one channel comprises:
an exposed portion defined on a first terminal surface of the substrate,
a base portion defined between the first terminal surface and a second terminal surface of the substrate,
two channel walls extending from the exposed portion to the base portion;
placing at least one light source between the exposed portion and base portion of the at least one channel; and
pouring a liquid compound into an intermediate portion of the at least one channel, the intermediate portion extending from the two channel walls, the exposed portion, and the base portion to the at least one light source.

20. The assembly of claim 19, wherein the compound diffuses light emanating from the at least one light source.

21. The assembly of claim 20, wherein the substrate reflects light emanating from the at least one light source.

22. The assembly of claim 20, wherein the substrate diffuses light emanating from the at least one light source.

23. The method of claim 19, wherein the at least one light source includes a plurality of light sources.

24. The method of claim 23, further comprising:
electrically coupling the plurality of light sources to one another.

25. The method of claim 24, further comprising:
coupling the plurality of light sources to a rechargeable power source housed within the substrate.

26. The method of claim 23, wherein the plurality of light sources are spaced equidistantly apart.

27. The method of claim 19, wherein the at least one light source is a light emitting diode.

28. The method of claim 27, wherein the at least one light source can be programmed to emit a plurality of colors.

29. The method of claim 19, further comprising:
curing the liquid compound into a solid state.

* * * * *